(12) United States Patent
Antonczyk et al.

(10) Patent No.: US 11,618,375 B2
(45) Date of Patent: Apr. 4, 2023

(54) AREA LIGHT INTEGRATED IN A CABIN FURNISHING ELEMENT

(71) Applicant: Zodiac Cabin Controls GmbH, Hamburg (DE)

(72) Inventors: Volker Antonczyk, Hamburg (DE); Birger Timm, Hamburg (DE); Lutz Neumann, Hamburg (DE); Henrik Heine, Hamburg (DE); Edwin van der Perk, Bokel (DE); Hermann Schotte, Buxtehude (DE); Rincke Bleicken, Hamburg (DE)

(73) Assignee: Zodiac Cabin Controls GmbH, Hamburg (DE)

( * ) Notice: Subject to any disclaimer, the term of this patent is extended or adjusted under 35 U.S.C. 154(b) by 0 days.

(21) Appl. No.: 17/401,586

(22) Filed: Aug. 13, 2021

(65) Prior Publication Data

US 2021/0370825 A1    Dec. 2, 2021

Related U.S. Application Data

(63) Continuation of application No. 16/637,438, filed as application No. PCT/IB2018/055872 on Aug. 3, 2018, now Pat. No. 11,104,271.

(Continued)

(51) Int. Cl.
*B60Q 3/64* (2017.01)
*B60Q 3/74* (2017.01)
(Continued)

(52) U.S. Cl.
CPC .............. *B60Q 3/64* (2017.02); *B60Q 3/43* (2017.02); *B60Q 3/745* (2017.02); *B64D 2011/0038* (2013.01)

(58) Field of Classification Search
CPC . B60Q 3/64; B60Q 3/43; B60Q 3/745; B60Q 3/44; B60Q 3/40; B60Q 3/51;
(Continued)

(56) References Cited

U.S. PATENT DOCUMENTS 8,641,250 B2   2/2014  Smith
9,643,536 B2   5/2017  Staudigel et al.
(Continued)

FOREIGN PATENT DOCUMENTS

EP          2915699         9/2015

OTHER PUBLICATIONS

International Patent Application No. PCT/IB2018/055872, International Search Report and Written Opinion, dated Nov. 2, 2018.
(Continued)

*Primary Examiner* — Peggy A Neils
(74) *Attorney, Agent, or Firm* — Kilpatrick Townsend & Stockton LLP

(57) ABSTRACT

A cabin furnishing element for a cabin, such as a cabin of an aircraft, includes a panel having a panel body. The panel body includes an illumination surface having an illumination zone, and defines a lighting recess within the panel body relative to the illumination surface. The panel also includes a lighting system having a light source assembly and a light guide. The light source assembly and light guide are retained within the lighting recess defined by the panel body. The lighting system is adapted to selectively illuminate a portion of the illumination zone.

20 Claims, 14 Drawing Sheets

Related U.S. Application Data

(60) Provisional application No. 62/541,818, filed on Aug. 7, 2017.

(51) Int. Cl.
 *B60Q 3/43* (2017.01)
 *B64D 11/00* (2006.01)

(58) Field of Classification Search
 CPC .............. B60Q 3/62; B64D 2011/0038; B64D 2011/0053; B64D 11/00; G02B 6/0006; G02B 6/0023
 See application file for complete search history.

(56) References Cited

U.S. PATENT DOCUMENTS

| | | | |
|---|---|---|---|
| 9,862,301 B2 * | 1/2018 | Yamada | B60Q 1/302 |
| 10,737,562 B2 | 8/2020 | Hammer | |
| 2005/0007759 A1 | 1/2005 | Parker | |
| 2006/0114683 A1 | 6/2006 | Heym et al. | |
| 2007/0086201 A1 * | 4/2007 | Wang | B60Q 1/323 |
| | | | 362/100 |
| 2007/0109802 A1 | 5/2007 | Byran et al. | |
| 2010/0014009 A1 | 1/2010 | Stavaeus et al. | |
| 2012/0063154 A1 | 3/2012 | Cannon et al. | |
| 2012/0320621 A1 * | 12/2012 | Kleo | B32B 17/10018 |
| | | | 362/558 |
| 2015/0109815 A1 * | 4/2015 | Ichikawa | G02B 6/001 |
| | | | 362/606 |
| 2015/0232168 A1 | 8/2015 | Kircher et al. | |
| 2017/0023723 A1 * | 1/2017 | Tanaka | F21S 43/27 |
| 2018/0178718 A1 | 6/2018 | Park | |

OTHER PUBLICATIONS

U.S. Appl. No. 16/637,438, Non-Final Rejection, dated Jul. 6, 2020.
U.S. Appl. No. 16/637,438, Notice of Allowance, dated May 7, 2021.
Europe Patent Application No. 18762633.8, Office Action (Communication pursuant to Article 94(3) EPC), dated Feb. 9, 2022, 7 pages.

* cited by examiner

AREA LIGHT INTEGRATED IN A CABIN FURNISHING ELEMENT

REFERENCE TO RELATED APPLICATION

This application is a continuation of U.S. Non-Provisional patent application Ser. No. 16/637,438, filed Feb. 7, 2020, which application is the U.S. national stage entry of International Patent Application No. PCT/IB2018/055872, filed Aug. 3, 2018, which application claims the benefit of U.S. Provisional Patent Application No. 62/541,818, filed Aug. 7, 2017, and entitled AREA LIGHT INTEGRATED IN A CABIN FURNISHING ELEMENT, the contents the each of which are hereby incorporated by reference in their entireties.

FIELD OF THE INVENTION

This application relates to lighting systems, and more particularly to lighting systems and devices integrated in a cabin furnishing element, such as a cabin furnishing element for an aircraft cabin.

BACKGROUND

Lighting systems are used to provide lighting or illumination in various spaces, including, but not limited to, cabins of various passenger vehicles such as aircraft, trains, buses, or various other passenger vehicles. However, existing lighting systems are often bulky and take up a large installation volume within the cabin, provide insufficient illumination patterns, are difficult to access, and are difficult to combine with other components such as various cabin furnishing elements. Moreover, because lighting systems are separate components and installed separately from cabin furnishing elements, the resulting illumination is not smooth. Therefore, there is a need for improved lighting systems and cabin furnishing elements.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a cabin furnishing element includes a panel and a lighting system. The panel includes a panel body including an illumination surface having an illumination zone, and defining a lighting recess within the panel body relative to the illumination surface. The lighting system includes a light source assembly and a light guide retained within the lighting recess defined by the panel body. The lighting system is adapted to selectively illuminate a portion of the illumination zone.

According to some embodiments, a cabin furnishing element includes a panel and a lighting system. The panel includes a panel body that defines a lighting recess within the panel body and having a recess opening in the panel body. The lighting system includes a light source and a light guide within the lighting recess. The light guide is configured to direct a light source emission from the light guide through the recess opening.

According to various embodiments, a cabin furnishing element includes a panel and a lighting system. The panel includes a panel body having a first surface and a second surface opposite from the first surface. The panel body defines a lighting recess having an opening in the first surface. The lighting system includes a light source retained within the lighting recess and positioned such that a light source emission from the light source is directed through the recess opening.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
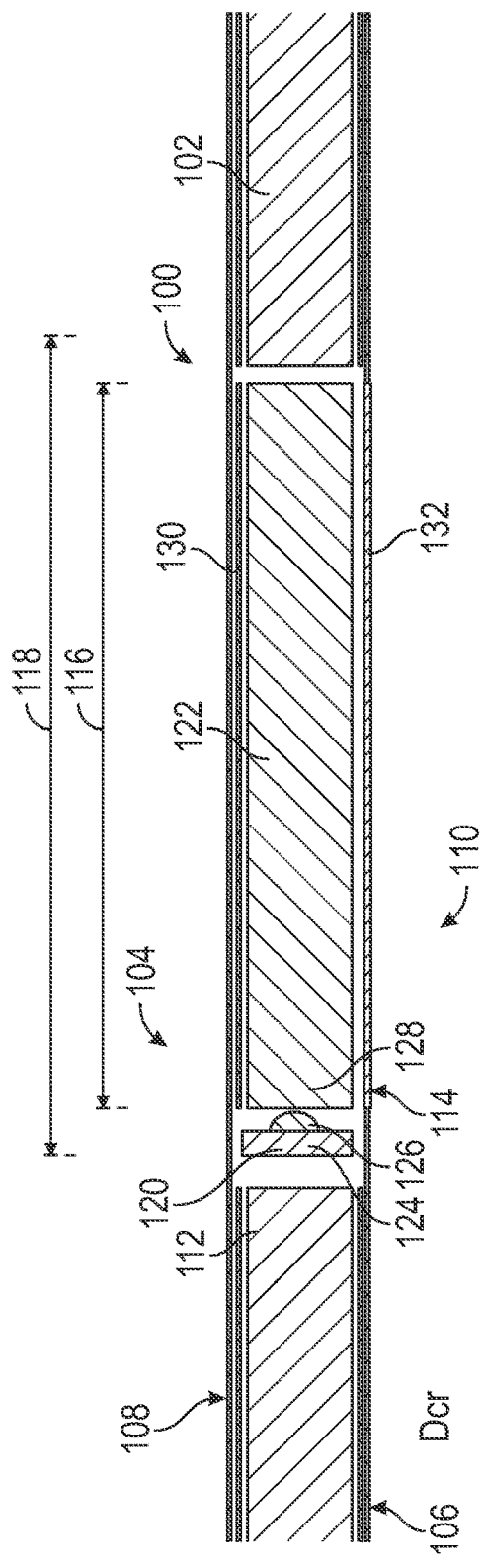
FIG. 1 is a schematic of a portion of a cabin furnishing element according to aspects of the current disclosure.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "top," "bottom," "left," "right," "front," and "back," among others, are intended to refer to the orientation as illustrated and described in the figure (or figures) to which the components and directions are referencing. References herein to "consisting of" may, in at least some circumstances, encompass "consisting essentially of" or "comprising."

In some aspects, disclosed is a cabin furnishing element having an integrated lighting system. The cabin furnishing element may be provided as a component of a cabin furnishing system, including, but not limited to, an aircraft cabin furnishing system. In certain aspects, the cabin furnishing element may be a component of various cabin monuments or structures, including, but not limited to, a ceiling panel, a sidewall panel, a stowage bin, a lavatory panel, or various other suitable structures.

The cabin furnishing element includes a panel that defines a lighting recess in a body of the panel, and a lighting system retained within the lighting recess. The lighting recess includes a light source and a light guide. In some examples, the light source includes a light emitting diode (LED), although various other suitable light sources may be utilized. The light guide is configured to direct a light source emission from the light source to an illumination zone of the panel. In some aspects, the light source and light guide are arranged in the lighting recess such that the light source is adjacent to an edge of the light guide and a light source emission from the light source is directed directly into the light guide. In other aspects, the light source is spaced apart from an edge of the light guide, and the lighting system includes an optical diverter between the light source and the light guide such that the light source emission is directed to the light guide through the optical diverter.

The cabin furnishing element with the integrated lighting system is compact in size and minimizes or reduces the number of components in the cabin. The cabin furnishing element has a low profile and/or an installation volume that is less than traditional illumination systems, and as such the saved volume may be used for other cabin features and/or used to maximize space for the passenger. In some aspects, the cabin furnishing element provides a smooth and homogenous illumination surface with minimized transition edges, and as such may provide an enhanced appearance and/or ambiance within the cabin. In certain aspects, the cabin furnishing element provides customized illumination. The cabin furnishing element may further provide easy access to components of the light system for service, maintenance, replacement, etc.

FIG. 1 illustrates an example of a cabin furnishing element 100 according to aspects of the present disclosure. In some aspects, the cabin furnishing element 100 may be a component of a cabin furnishing system for various areas of a cabin. In various examples, the cabin furnishing element 100 may be a ceiling panel a sidewall panel, a stowage bin, a lavatory panel, or various other suitable structures. Any desired number of cabin furnishing elements 100 may be utilized in a cabin furnishing system.

As illustrated in FIG. 1, the cabin furnishing element 100 includes a panel 102 and a lighting system 104. The panel 102 may be formed from materials, including, but not limited to aluminum, stainless steel, aramid fibers, polycarbonate, polypropylene, other metallic materials, composite materials, or other similar materials. The panel 102 generally includes a first surface 106 and a second surface 108 opposite from the first surface 106. In some aspects, the first surface 106 includes an illumination zone 110 through which a light source emission is directed, and as such the first surface 106 is an illumination surface. In such examples, the second surface 108 may face various support structures within the cabin when assembled as such may be a support surface. Although illustrated as generally planar surfaces, in various examples, the first surface 106 and/or the second surface 108 may have various shapes or profiles as desired, and accordingly the panel 102 may have various shapes or profiles as desired. For example, the first surface 106 and/or the second surface 108 may be flat or planar, may be arcuate shaped, may be angled, or may have various other profiles as desired. In some aspects, the profile of the first surface 106 need not be the same as the profile of the second surface 108 (see, e.g., FIGS. 4 and 5). The panel 102 may optionally include a decorative layer or covering on at least a portion of the first surface 106 and/or the second surface 108, although it need not in other examples.

The panel 102 defines a lighting recess 112 within the panel 102. The lighting recess 112 is adapted to retain the lighting system 104 within the panel 102. In some aspects, the lighting recess 112 has a recess opening 114 that corresponds to the illumination zone 110 such that the light source emission from the lighting system 104 may pass to the illumination zone 110. In some optional aspects, a width 116 of the recess opening 114 may be less than a width 118 of the lighting recess 112 such that portions of the lighting recess 112 are covered by portions of the panel 102, although it need not be in other examples. While a single lighting recess 112 is illustrated, the number of light recesses 112 should not be considered limiting on the current disclosure. For example, in other cases, the panel 102 may define a plurality of light recesses 112, which may or may not be optically connected.

The light system 104 includes a light source 120 and a light guide 122. Any number of light sources 120 and/or light guides 122 may be utilized as desired. Moreover, the light source 120 and/or light guide 122 may be arranged in various patterns and/or configurations on the cabin panel 102 as desired.

In some examples, the light source 120 may include at least one printed circuit board (PCB) 124 populated with one or more light emitting diodes (LEDs) 126 that are configured to emit a light source emission. Each PCB 124 can have wiring for connecting to a power supply, which can be shared between PCBs or each PCB could have its own power supply. The LEDs 126 may be single-die or multi-die LEDs, DC or AC, can be organic LEDS, and/or may be various other suitable LEDs. White, color, or multicolor LEDs may be used. Moreover, the LEDs 126 mounted on a PCB 124 need not all be the same color; rather, mixtures of LEDs may be used. Furthermore, in some embodiments no PCB is needed; rather, the LEDs 126 are chip-on-board LEDs. In other examples, the light source 120 may be various other suitable devices for emitting a light source emission.

The light guide 122 is configured to direct the light source emission from the light source 120. The light guide 122 may include various suitable materials for directing the light source emission including, but not limited to, air, various transparent materials, and/or various other suitable materials or combinations of materials. As illustrated in FIG. 1, the light guide 122 includes at least one illumination edge 128 that receives the light source emission from the light source 120. In some examples, as illustrated in FIG. 1, the illumination edge 128 is positioned adjacent to the light source 120 (e.g., adjacent to the LEDs 126) such that the light source emission from the light source 120 is directly into the light guide 122. In other examples, and as described in detail below with reference to FIG. 2, the illumination edge 128 may be spaced apart from the light source 120, and an optical diverter is provided between the light guide 122 and the light source 120 such that the light source emission from the light source 120 is directed to the light guide 122 through the optical diverter.

As illustrated in FIG. 1, the light source 120 and the light guide 122 are retained within the lighting recess 112. In certain aspects, the panel 102 covers a portion of the light system 104 within the lighting recess 112. In the example of FIG. 1, the panel 102 covers the light source 120 within the lighting recess 112.

In addition to the light source 120 and the light guide 122, the lighting system 104 may include various other optional features. For example, in some cases, the lighting system 104 includes a reflector 130 within the lighting recess 112 that aids in distributing the light source emission. Optionally, an optic 132 (such as a lens, diffuser, or other suitable optic) is positioned on or over the recess opening 114. The optic 132 can be made of any non-metallic material that permits light to exit through the optic 132, including, but not limited to, polymeric materials, silicone and various other suitable materials for light distribution. In certain aspects, the optic 132 includes an optic surface and the optic 132 is positioned such that the optic surface and the first surface 106 form a substantially continuous surface.

When the light system 104 is activated, the light source 120 provides the light source emission that is directed to the light guide 122, which provides illumination to the illumination zone 110 of the panel 102.

Figure 2:
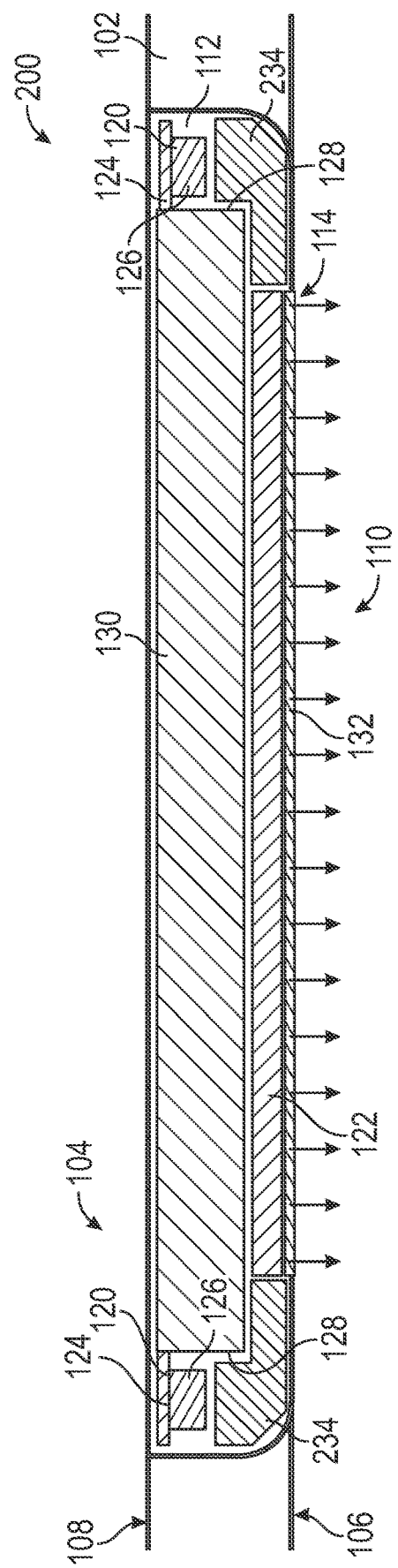
FIG. 2 is a schematic of a portion of a cabin furnishing element according to aspects of the current disclosure.

FIG. 2 illustrates an example of a cabin furnishing element 200 that is substantially similar to the cabin furnishing element 100 except that the cabin furnishing element includes two light sources 120, and each of the light sources 120 is spaced apart from the corresponding illumination edges 128 of the light guide 122. In such examples, an optical diverter 234 may be provided between the light source 120 and the corresponding illumination edge 128 such that the light source emission from the light source 120 is directed to the light guide 122 through the optical diverter 234. The optical diverter 234 may be various suitable devices for directing the light source emission from the light source 120 to the light guide 122 including, but not limited to, a prism, optical cable, or various other suitable devices. In certain examples, the optical diverter 234 may divert the light source emission in the needed direction and at various suitable angles. As one non-limiting example, the optical diverter 234 may divert the light source emission at about 90°, at a non-zero angle, at a square angle, a zero angle, or various other angles as desired. In some aspects, the optical diverter 234 may allow for the cabin furnishing element 200 to be more adaptable and/or customizable as desired because the light source 120 can be spaced apart from the light guide 122.

Figure 3:
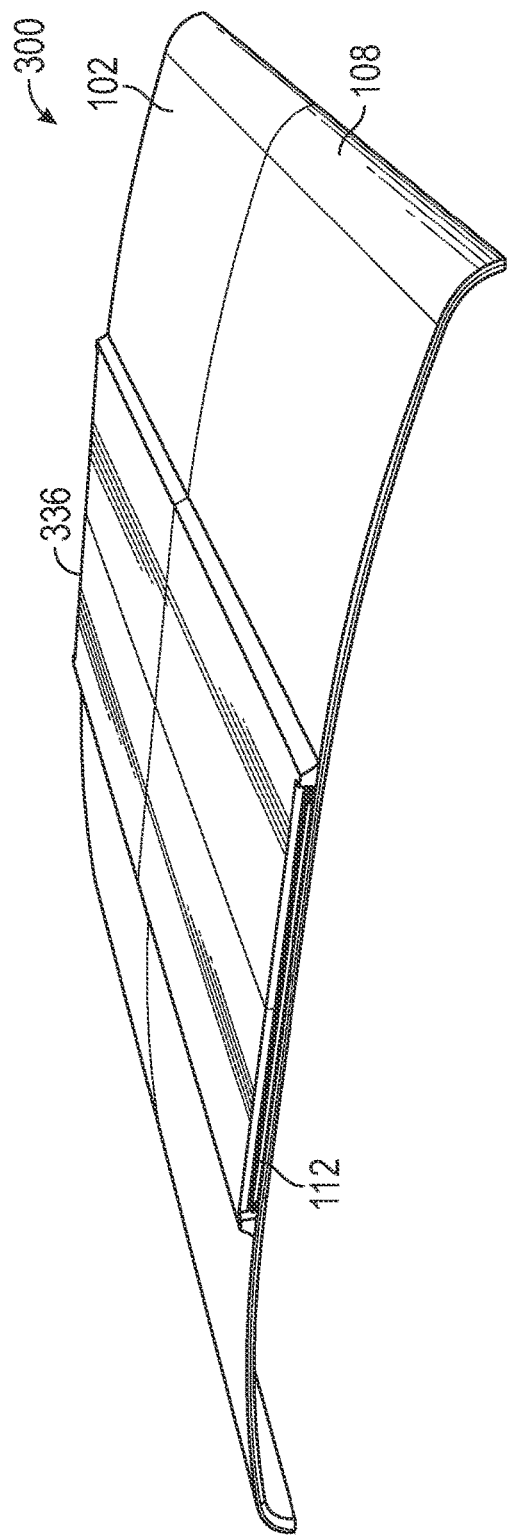
FIG. 3 is a perspective view of a cabin furnishing element according to aspects of the current disclosure.
Figure 4:
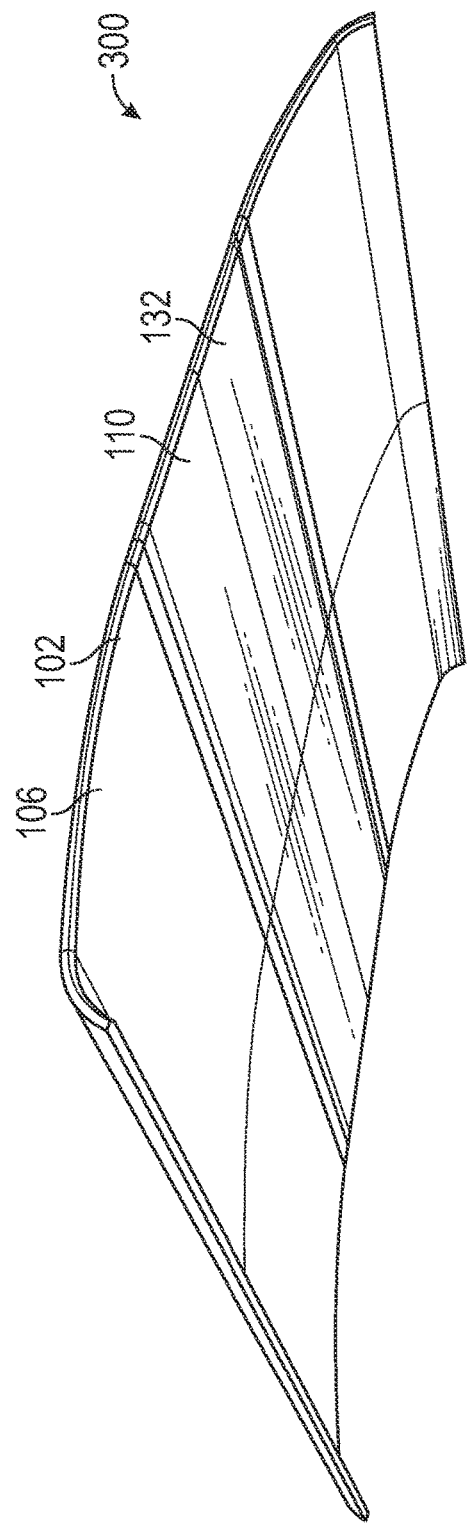
FIG. 4 is another perspective view of the cabin furnishing element of FIG. 3.
Figure 5:
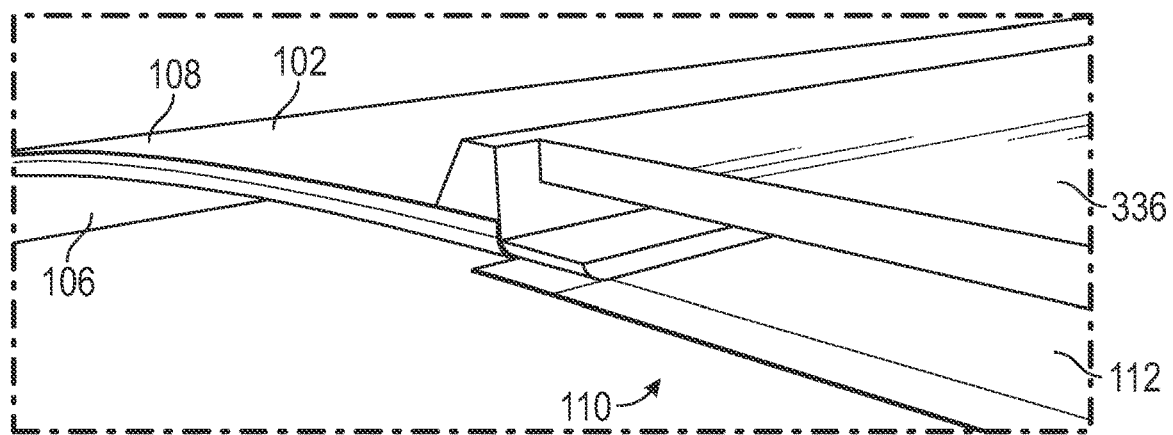
FIG. 5 is a perspective view of a panel of the cabin furnishing element of FIG. 3.
Figure 6:
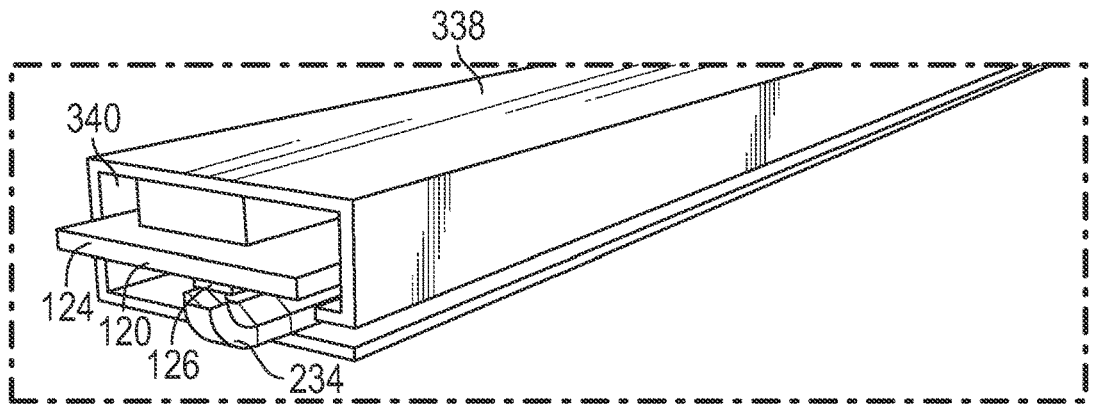
FIG. 6 is a perspective view of a portion of a lighting system of the cabin furnishing element of FIG. 3.
Figure 7:
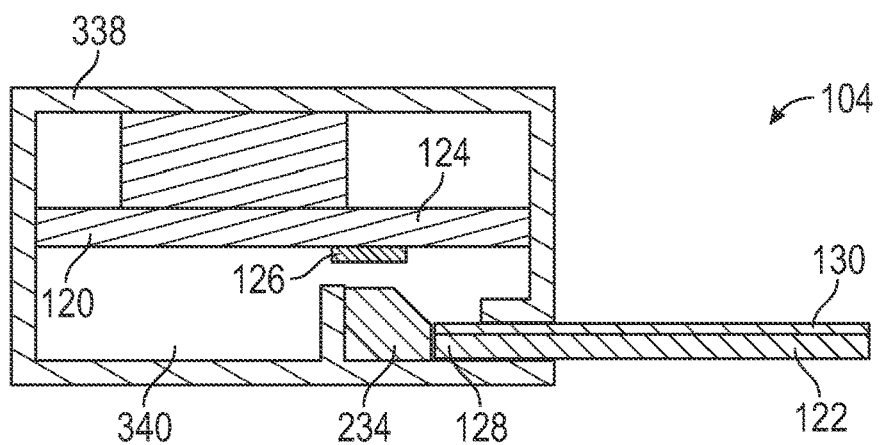
FIG. 7 is a side view of a portion of the lighting system of the cabin furnishing element of FIG. 3.

FIGS. 3-12 illustrate an example of a cabin furnishing element 300 that is substantially similar to the cabin furnishing element 200. Compared to the cabin furnishing element 200, the panel 102 of the cabin furnishing element 300 is generally arcuate shaped. As best illustrated in FIGS. 3 and 4, the profile of the first surface 106 is different from the profile of the second surface 108 in that the second surface 108 includes a covering projection 336. In some examples, the covering projection 336 may be integrally or monolithically formed with the panel 102. In other examples, the covering projection 336 may be a component that is attached to the panel 102 after the panel 102 is formed. In some aspects, the covering projection 336 may be permanently attached to the panel 102 or may be removably attached to the panel 102 through various suitable mechanisms including, but not limited to screws, bolts, rivets, pins, hooks, adhesives, and/or other mechanical or chemical fasteners.

As illustrated in FIGS. 6-12, in some aspects, the cabin furnishing element 300 optionally includes a housing 338 that is positionable within the lighting recess 112. The housing 338 may be integrally formed with the panel 102 or may be insertable into the lighting recess 112 after the panel 102 has been formed. The housing 338 may be formed from a material that is the same as or different from the material used to form the panel 102.

In various aspects, the housing 338 includes a housing chamber 340. In some aspects, various components and/or portions of components of the lighting system 104 are positionable within the housing chamber 340. In the example of FIGS. 6-12, the light source 120 and optical diverter 234 are positioned within the housing chamber 340, and the illumination edge 128 of the light guide 122 is further positionable within the housing chamber 340. In various examples, the housing 338 may provide additional support and protection to components of the lighting system 104. The housing 338 may further assist the lighting system 104 provide homogenous and/or uniform lighting to the illumination zone 110 by concealing the direction of the light source emission to the light guide 122 from the light source 120 and/or optical diverter 234.

Figure 8:
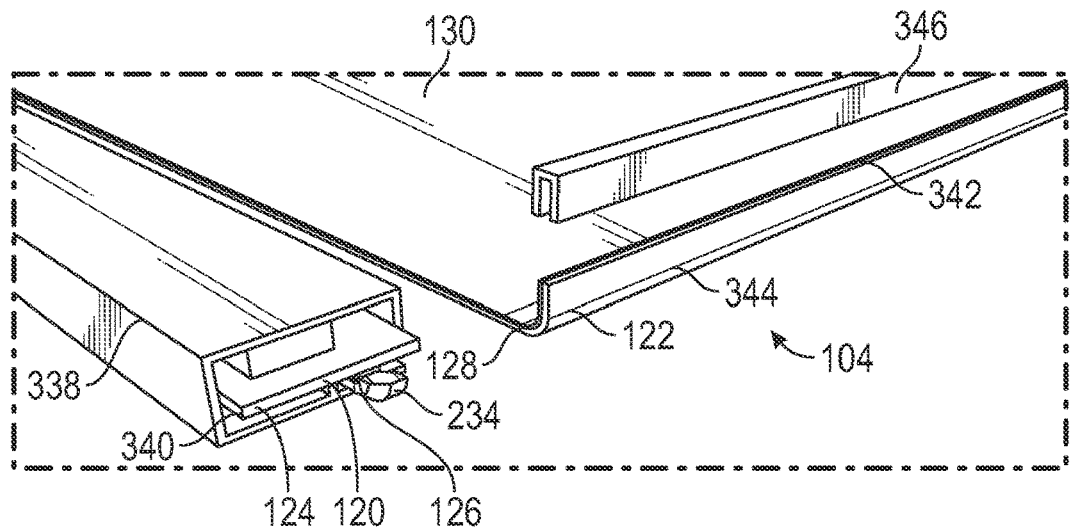
FIG. 8 is a partially exploded assembly view of the lighting system of FIG. 7.
Figure 9:
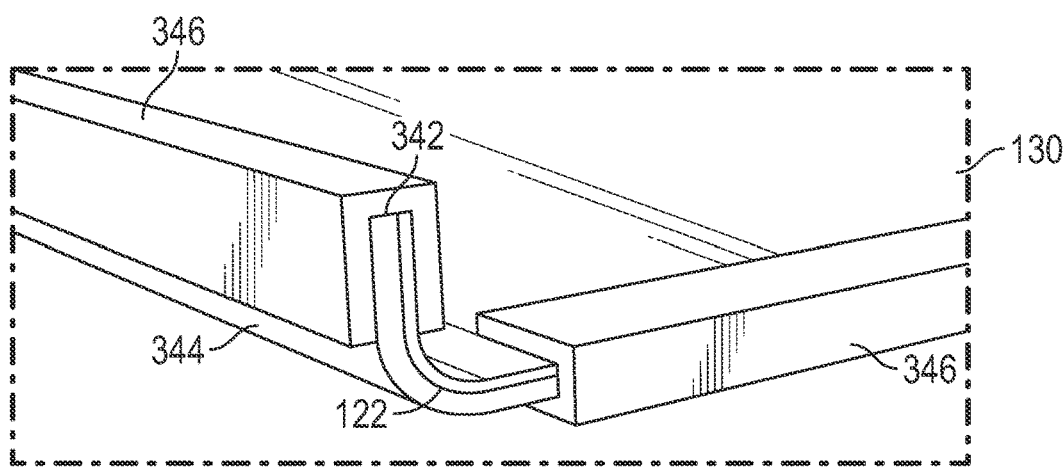
FIG. 9 is a perspective view of a light guide of the lighting system of FIG. 6.
Figure 10:
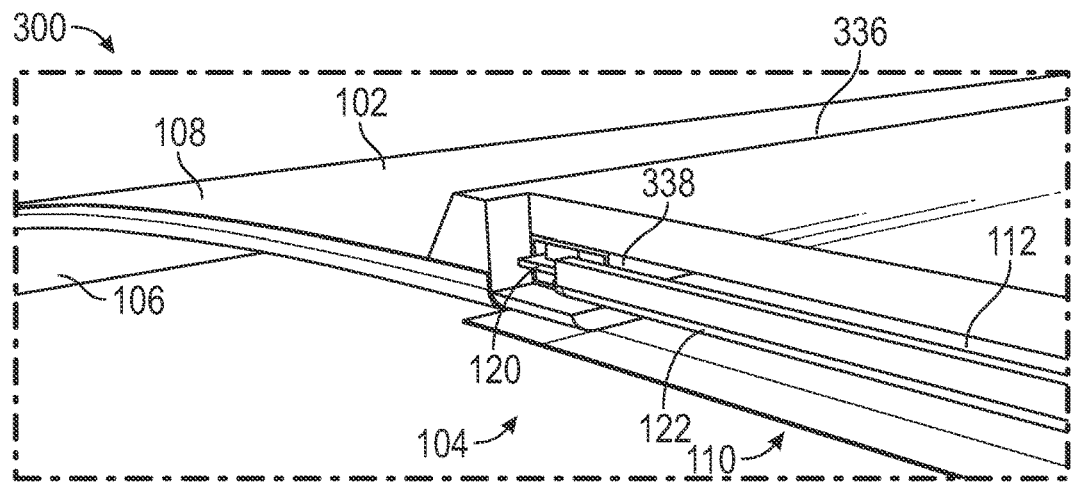
FIG. 10 is a perspective view of a portion of the cabin furnishing element of FIG. 3 partially assembled.
Figure 11:
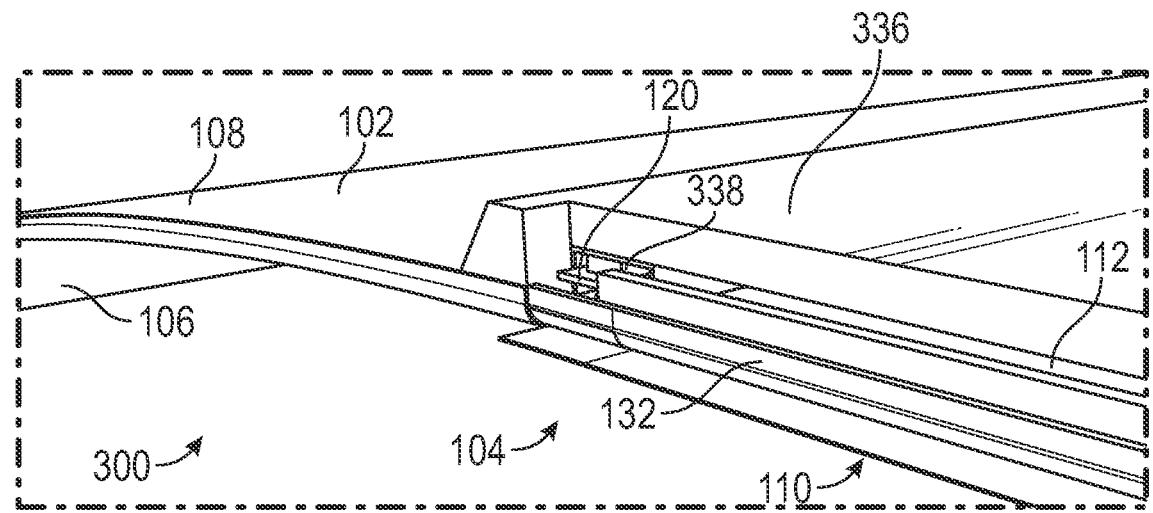
FIG. 11 is a perspective view of a portion of the cabin furnishing element of FIG. 3 partially assembled.
Figure 12:
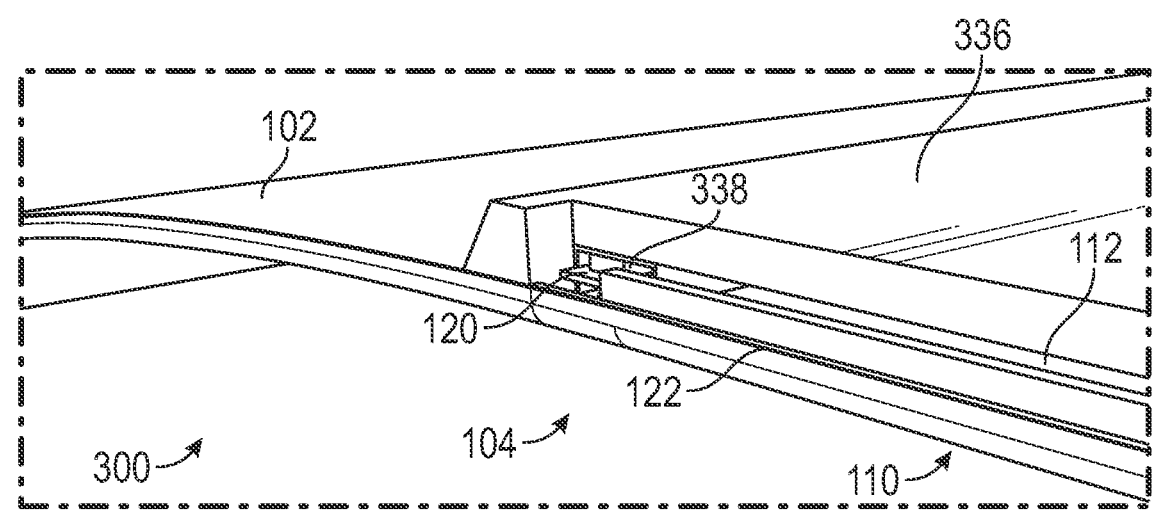
FIG. 12 is a schematic of a portion of a cabin furnishing element according to aspects of the current disclosure.

In some examples, as best illustrated in FIGS. 8 and 9, the light guide 122 optionally includes a border edge 342 adjacent to illumination edge 128. In some aspects, the light guide 122 is shaped such that the border edge 342 forms an infinity edge 344, meaning that the side of the light guide 122 is curved such that the border edge 342 is minimized or concealed when viewed from a plan view. In some examples, forming the infinity edge 344 includes vertically positioning the border edge 342 above the illumination edge 128, although it need not in other examples. In certain cases, the infinity edge 344 may allow for illumination from the cabin furnishing element 300 in an additional direction relative to the panel 102. The infinity edge 344 may further provide a more homogenous and/or customizable illumination pattern that minimizes or reduces sharp transition areas between portions of the cabin furnishing element 300 that are illuminated and portions that are not illuminated. Optionally, a cover 346 may be provided on the border edge 342 to further control light distribution in the infinity edge 344. As illustrated in FIG. 9, in some aspects, a cover 346 may also optionally be provided on other edges of the light guide 122 as desired.

Figure 13:
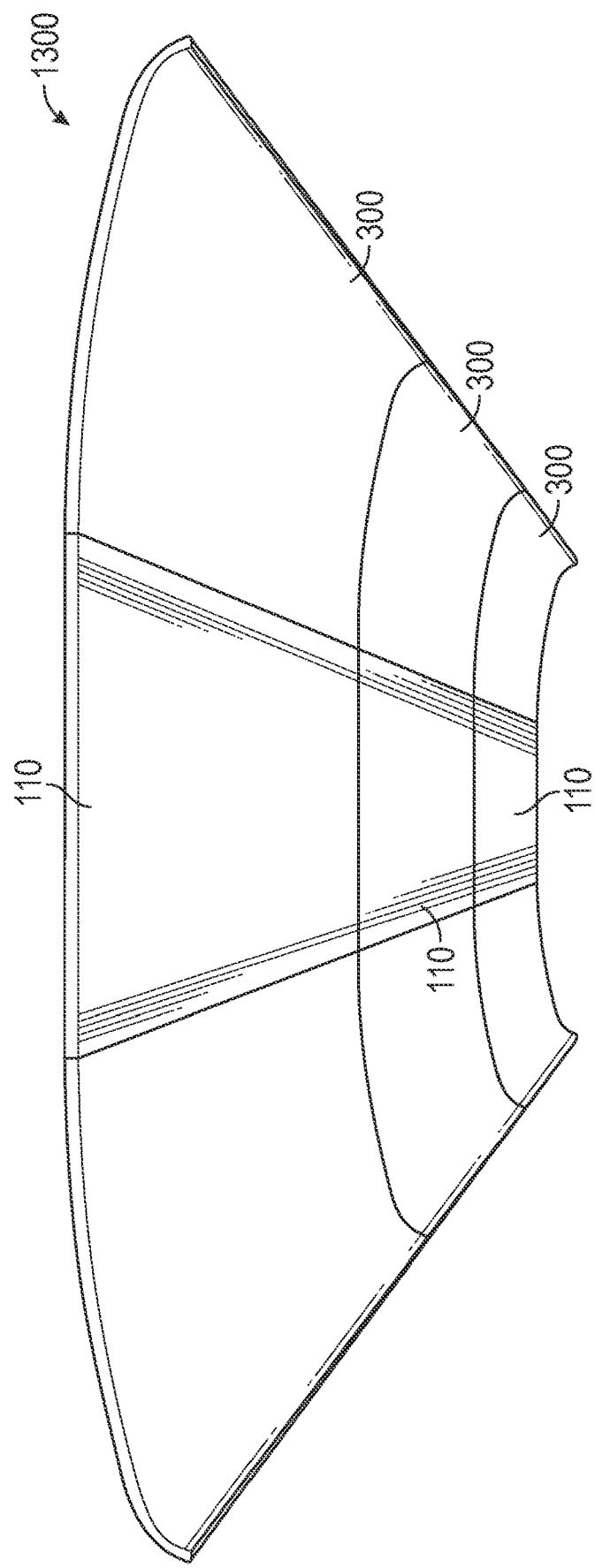
FIG. 13 is perspective view of a cabin furnishing system including a plurality of the cabin furnishing elements of FIG. 3.

FIG. 13 illustrates an example of a cabin furnishing system 1300 that includes three of the cabin furnishing elements 300. In other examples, various other types of cabin furnishing elements and/or combinations of types of cabin furnishing elements may be utilized. In the example of FIG. 13, the cabin furnishing system 1300 forms a ceiling of a cabin of an aircraft, and the cabin furnishing elements 300 are ceiling panels. However, in other examples, the cabin furnishing system 1300 may form various other structures for a cabin, including, but not limited to, sidewall panels, a stowage bin, lavatory panels, or various other suitable structures. In addition, while three cabin furnishing elements are illustrated in FIG. 13, it will be appreciated that any desired number of cabin furnishing elements may be used with the cabin furnishing system. For example, the cabin furnishing system 1300 may include one cabin furnishing element, two cabin furnishing elements, or more than three cabin furnishing elements.

Figure 14:
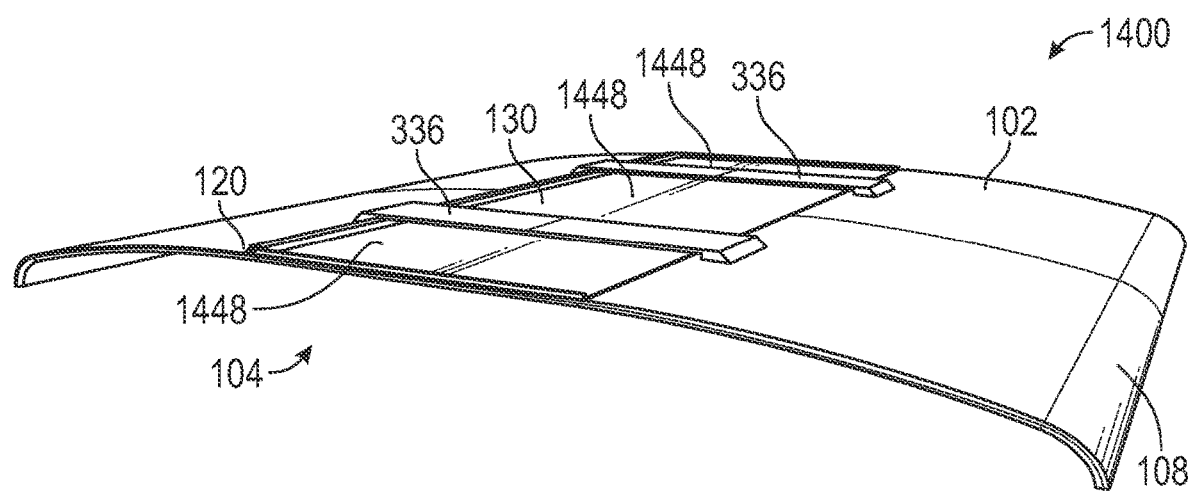
FIG. 14 is a perspective view of a cabin furnishing element according to aspects of the current disclosure.
Figure 15:
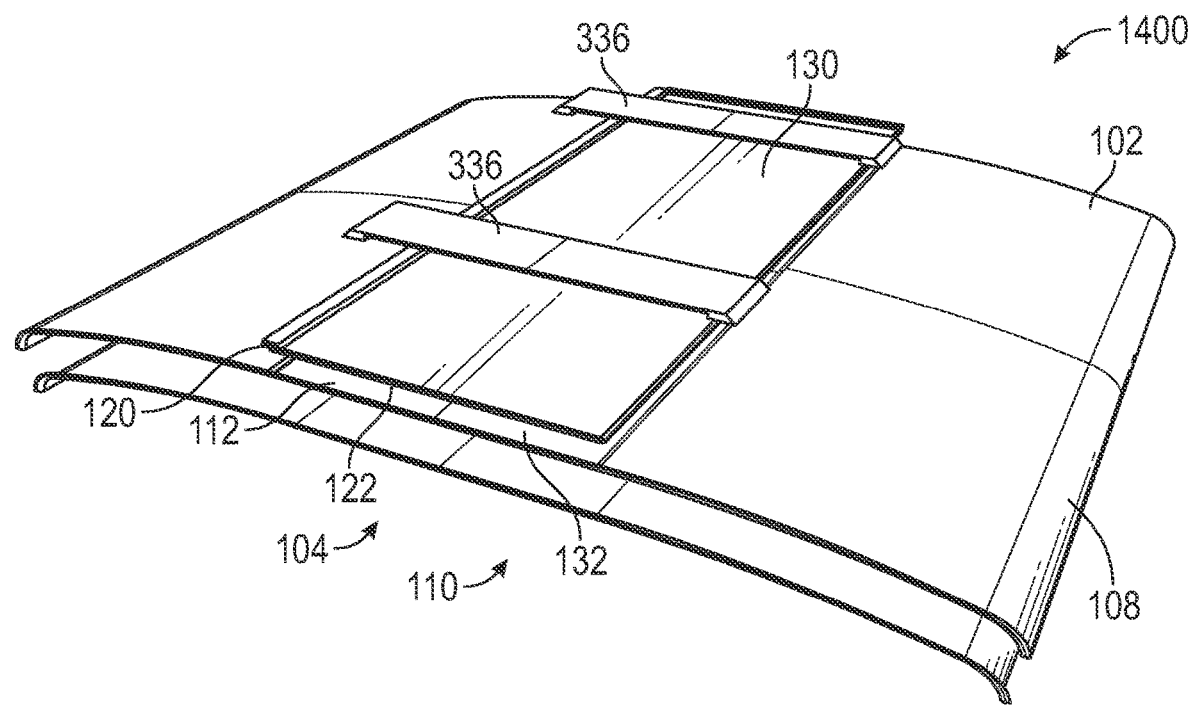
FIG. 15 is a partially exploded assembly view of the cabin furnishing element of FIG. 14.

FIGS. 14 and 15 illustrate an example of a cabin furnishing element 1400 that is substantially similar to the cabin furnishing element 300 except that the cabin furnishing element 1400 includes two covering projections 336. In the cabin furnishing element 1400, the second surface 108 defines at least one insertion opening 1448 that selectively provides access to the lighting recess 112 (and as such the components of the lighting system 104) through the second surface 108.

Figure 16:
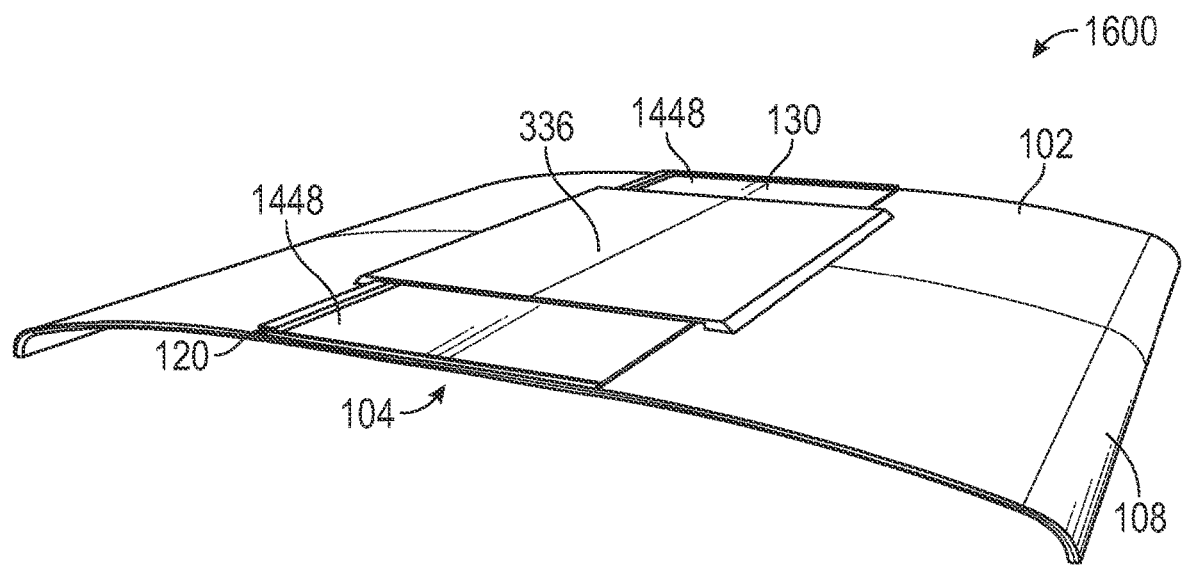
FIG. 16 is a perspective view of a cabin furnishing element according to aspects of the current disclosure.
Figure 17:
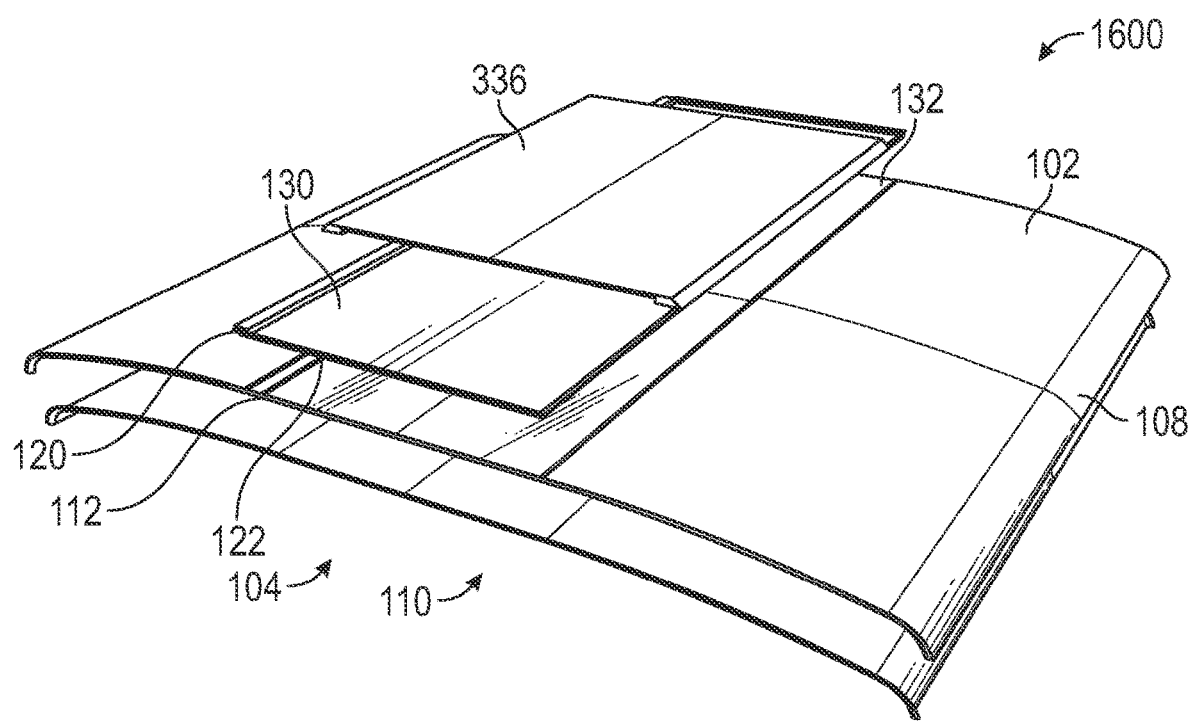
FIG. 17 is a partially exploded assembly view of the cabin furnishing element of FIG. 16.
Figure 18:
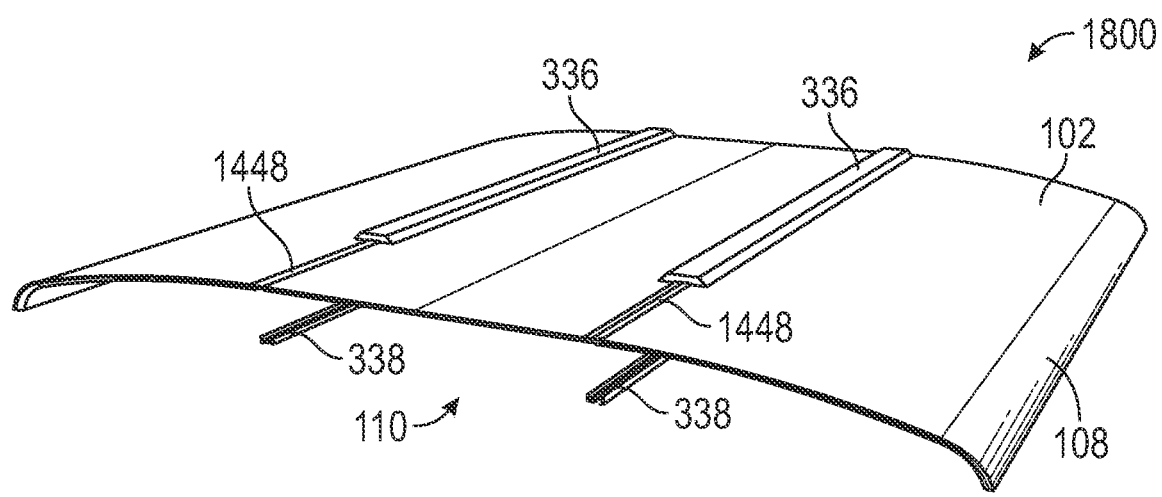
FIG. 18 is a partially exploded assembly view of a cabin furnishing element according to aspects of the current disclosure.
Figure 19:
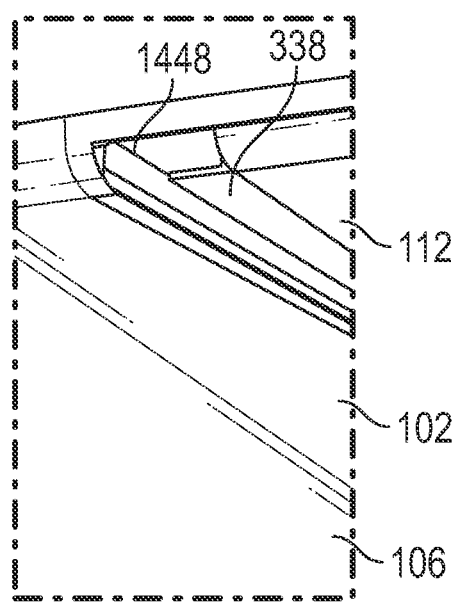
FIG. 19 is a perspective view of a portion of the cabin furnishing element of FIG. 18.
Figure 20:
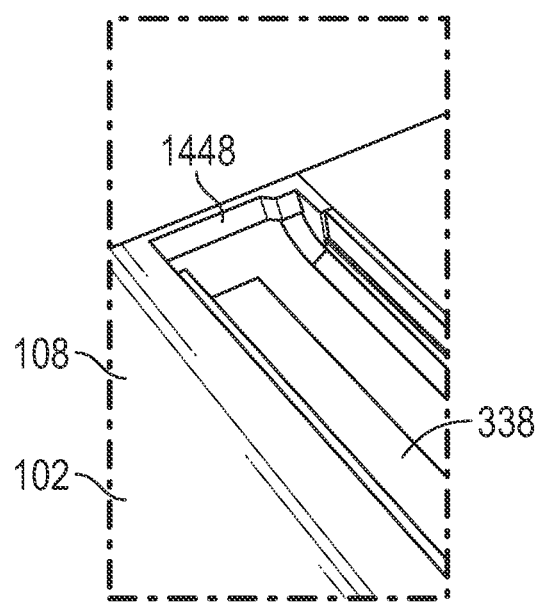
FIG. 20 is a perspective view of a portion of the cabin furnishing element of FIG. 18.
Figure 21:
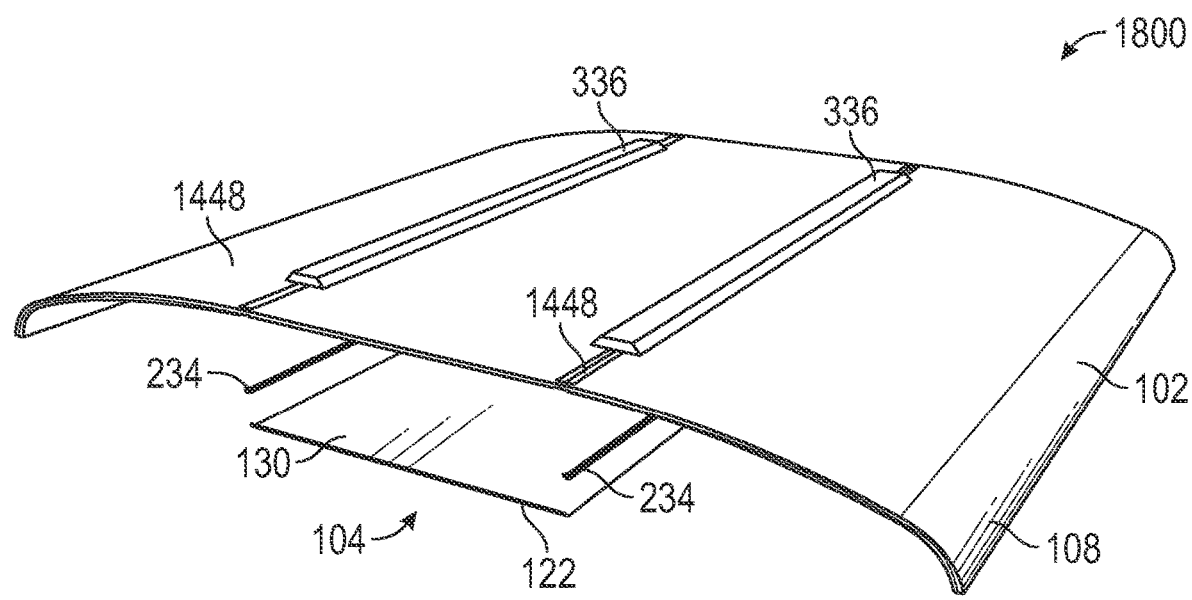
FIG. 21 is a perspective view of the cabin furnishing element of FIG. 18 during assembly.
Figure 22:
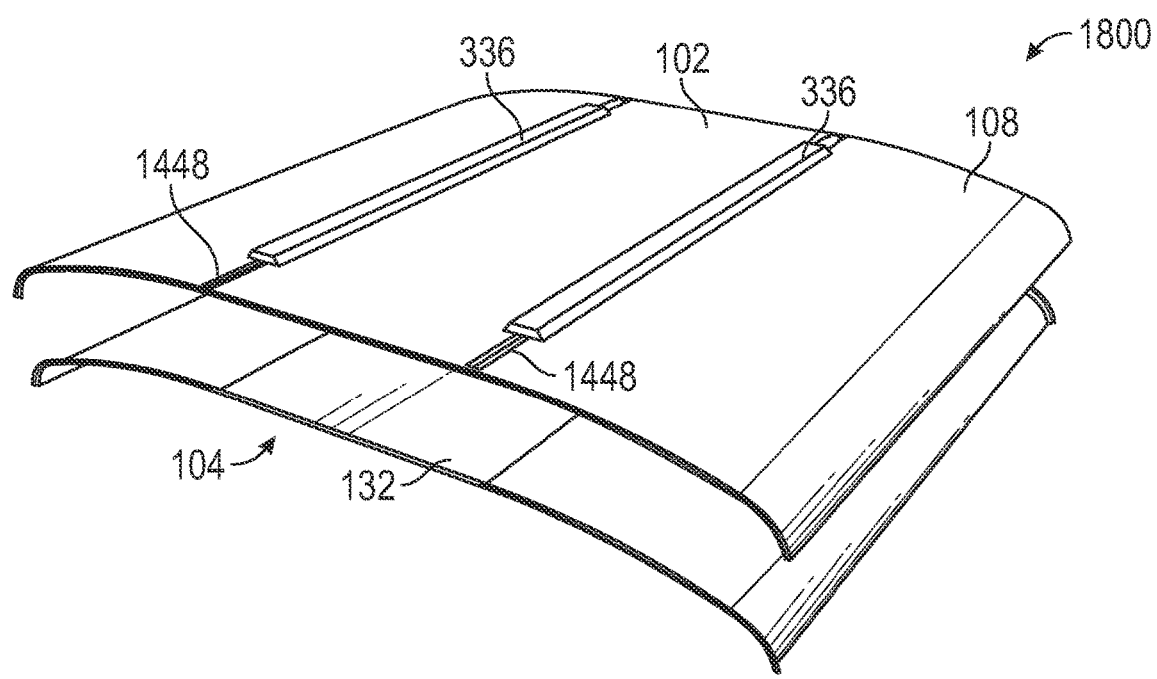
FIG. 22 is a perspective view of the cabin furnishing element of FIG. 18 during assembly.

FIGS. 16 and 17 illustrate an example of a cabin furnishing element 1600 that is substantially similar to the cabin furnishing element 300 except that the second surface 108 of the cabin furnishing element 1600 further defines the insertion openings 1448 that provide access to the lighting recess 112 (and as such the components of the lighting system 104) through the second surface 108.

Figure 23:
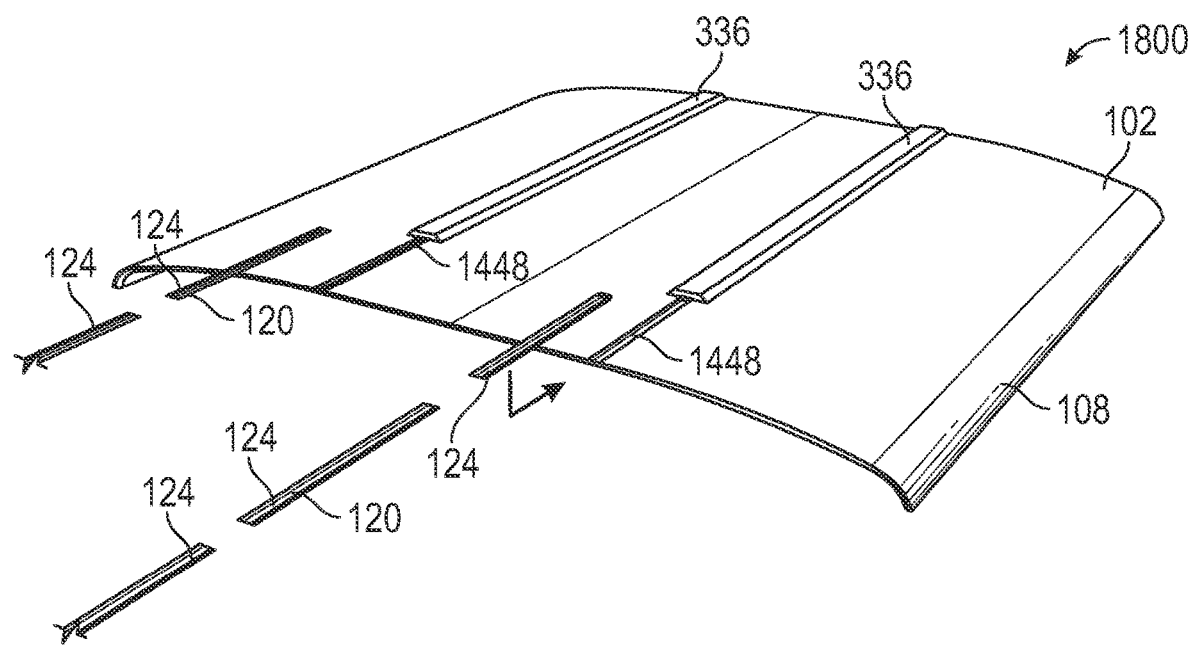
FIG. 23 is a perspective view of the cabin furnishing element of FIG. 18 during assembly.
Figure 24:
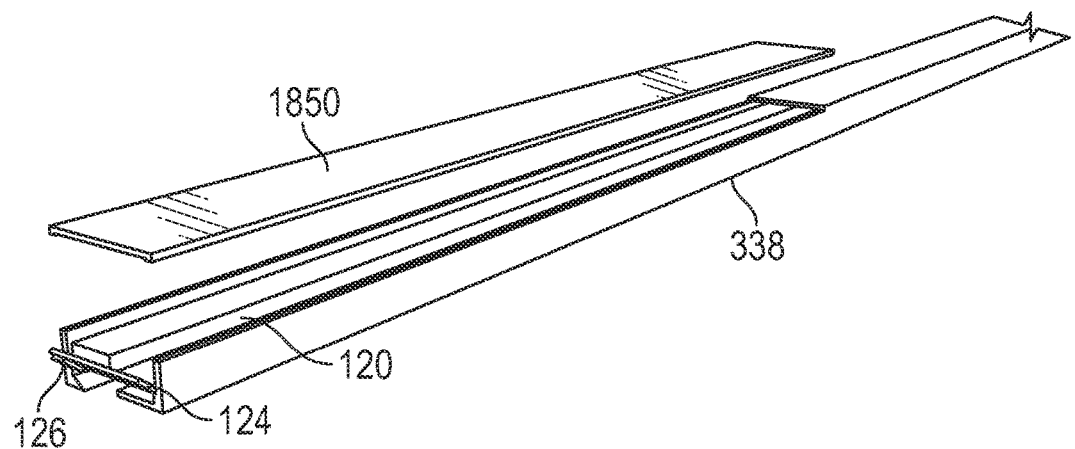
FIG. 24 is a perspective view of a light source of a lighting system of the cabin furnishing element of FIG. 18.
Figure 25:
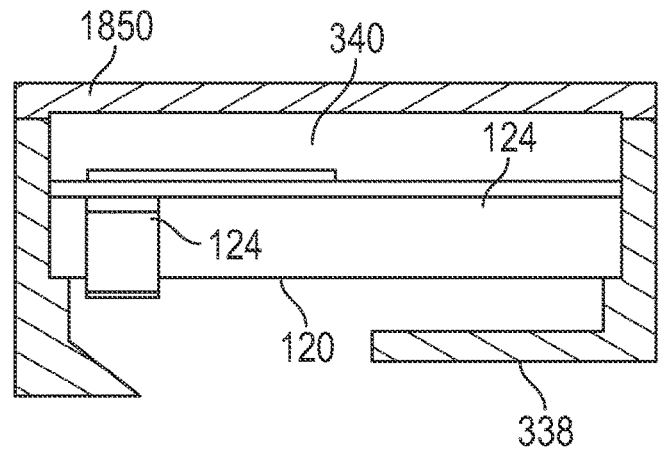
FIG. 25 is a side view of the light source of FIG. 24.

FIGS. 18-28 illustrate an example of a cabin furnishing element 1800 that is substantially similar to the cabin furnishing element 300. Compared to the cabin furnishing element 300, the cabin furnishing element 1800 includes two housings 338 that are integrally formed with the panel 102, and each housing 338 includes a light source 120. The cabin furnishing element 1800 also includes two covering projections 336. In addition, the second surface 108 of the panel 102 defines two insertion openings 1448 providing access to the lighting recess 112. In the example of FIGS. 18-28, one of the insertion openings 1448 provides access to one of the housings 338 and the other insertion opening 1448 provides access to the other housing 338. In some aspects, and as illustrated in FIG. 23, during assembly of the cabin furnishing element 1800, the light sources 120 are slidably positioned within the housing chambers 340 through the insertion openings 1448, respectively.

Optionally, the cabin furnishing element 1800 includes housing covers 1850 that selectively enclose the housings 338 and/or insertion openings 1448 after the light sources 120 are positioned within the housing chambers 340. The housing covers 1850 may be removably or permanently attached to the panel 102 and/or to the housings 338, respectively. In the example of FIGS. 18-29, each housing cover 1850 is attached to the corresponding housing 338.

Figure 26:
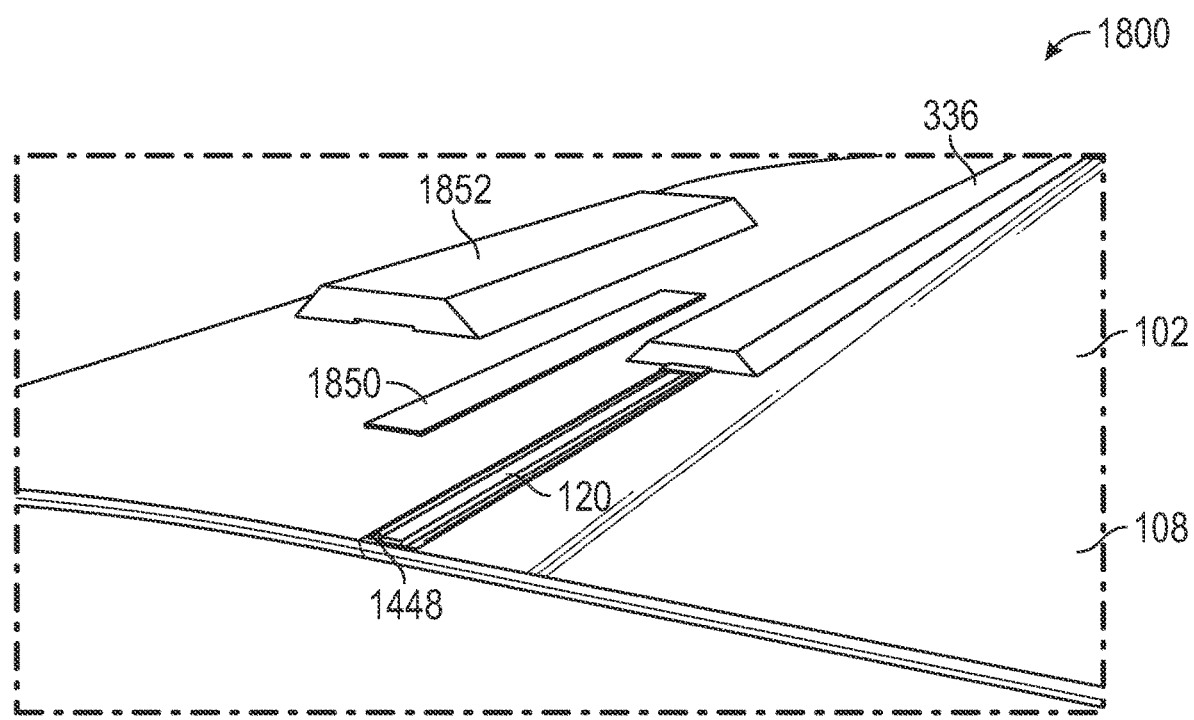
FIG. 26 is a perspective view of a portion of the cabin furnishing element of FIG. 18 during assembly.
Figure 27:
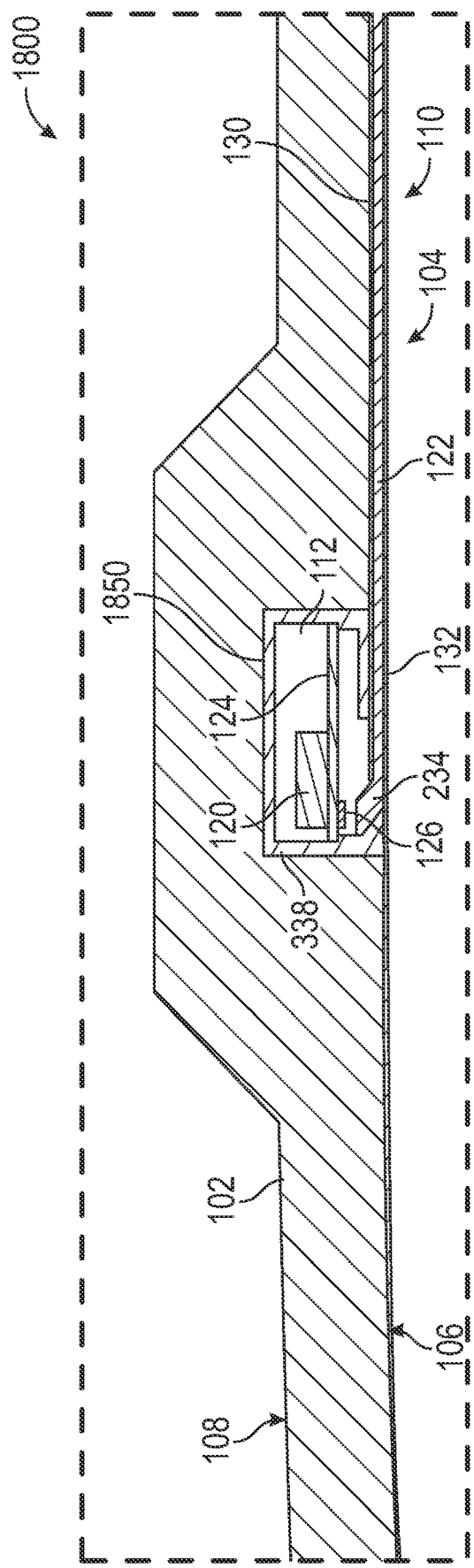
FIG. 27 is a sectional view of a portion of the cabin furnishing element of FIG. 18 fully assembled.

As illustrated in FIG. 26, the cabin furnishing element 1800 optionally includes a secondary cover 1852 that is selectively positionable on the second surface 108 of the panel 102 to cover the insertion openings 1448 and/or the housing covers 1850 and/or the housings 228. In some examples, a profile of the secondary cover 1852 may be substantially similar to a profile of the covering projections 336, although it need not be in other examples. The secondary covers may be removably or permanently secured to the cabin furnishing element 1800.

Figure 28:
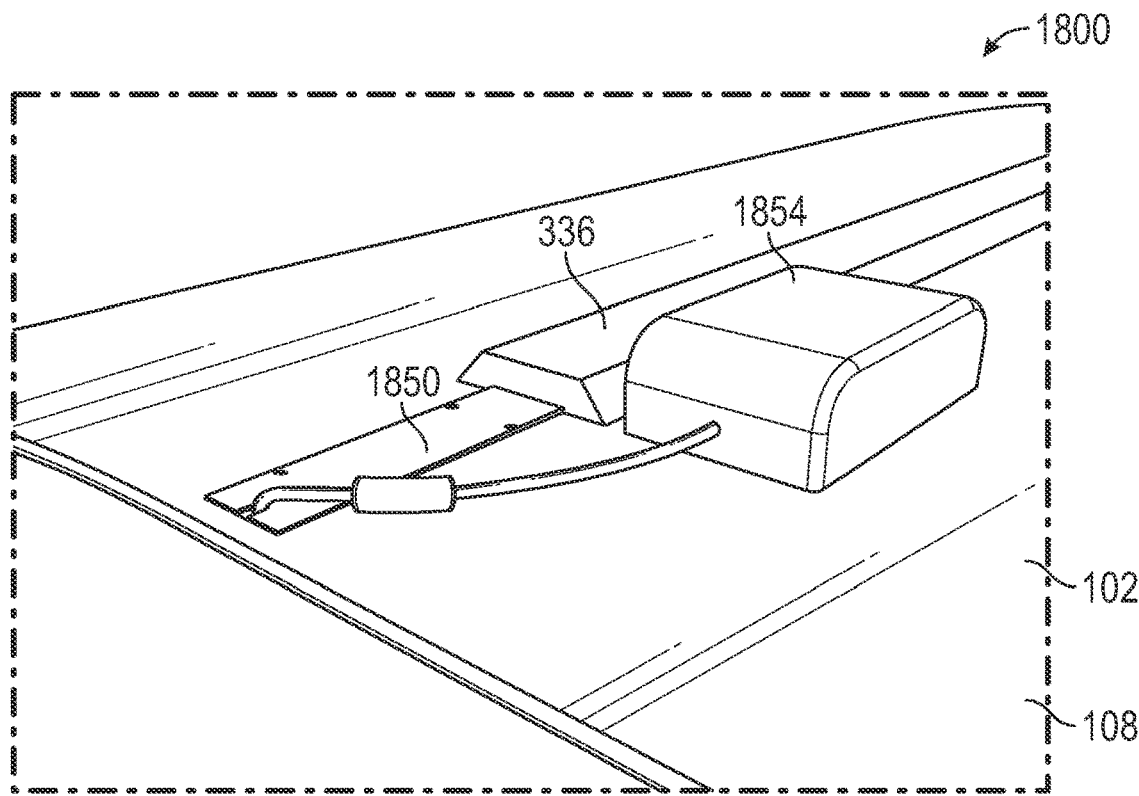
FIG. 28 is a perspective view of a portion of the cabin furnishing element of FIG. 18.

FIG. 28 illustrates a power supply 1854 that provides power to the light system 104. The power supply 1854 should not be considered limiting on the current disclosure. In various aspects, the power supply 1854 may provide power to one light source 120 or a plurality of light sources 120.

Figure 29:
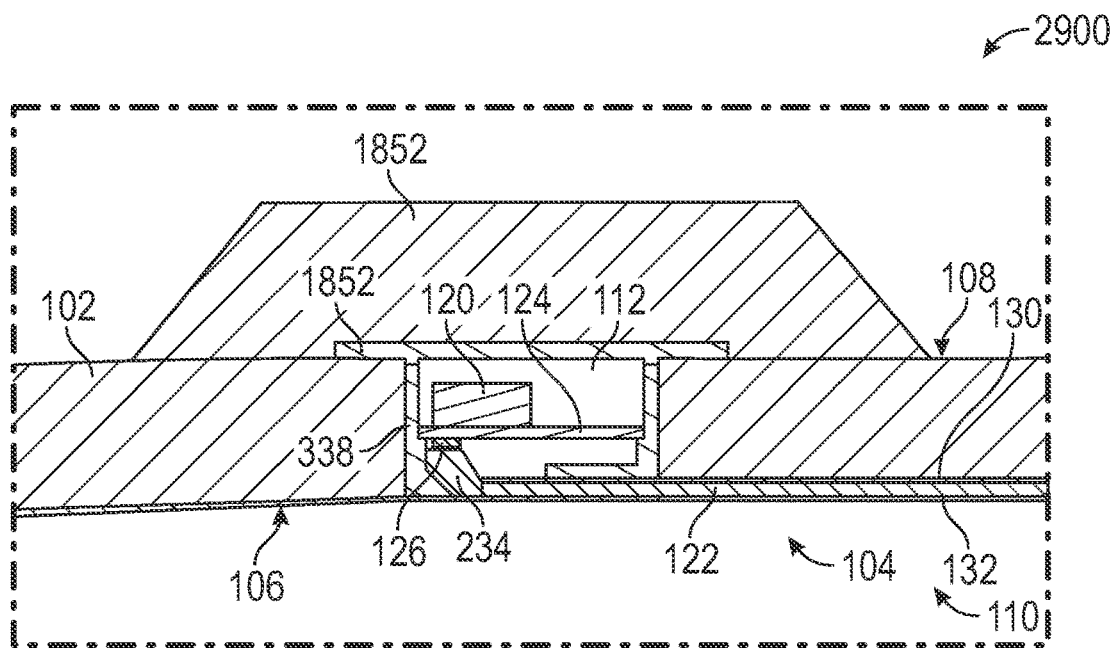
FIG. 29 is a sectional view of a portion of a cabin furnishing element according to aspects of the current disclosure.

FIG. 29 illustrates an example of a cabin furnishing element 2900 that is substantially similar to the cabin furnishing element 1800 except that the housing cover 1850 is attached to both the housing 338 and the panel 102.

A method of assembling a cabin furnishing element is also disclosed. The method includes forming the panel having the lighting recess through various suitable forming techniques. Optionally, forming the panel having the lighting recess includes monolithically forming the lighting recess with the housing for the light source. In other examples, the housing is secured within the lighting recess after the panel is formed. In further examples, the housing is omitted.

The method includes positioning the light source and the light guide of the lighting system within the lighting recess. In some aspects, the light source is positioned such that it is covered by a portion of the panel or the housing within the lighting recess, although it need not be in other examples. In certain cases, the light guide is positioned such that a portion of it, such as an illumination edge of the light guide, is covered by a portion of the panel or the housing within the lighting recess, although it need not be in other examples. In certain aspects, the light source is positioned such that it can direct the light source emission through the recess opening of the lighting recess and to the illumination zone of the panel.

In some cases, positioning the light source and the light guide includes positioning the illumination edge of the light guide adjacent to the light source such that the light source emission is directly into the light guide. In other examples, positioning the light source and the light guide includes positioning the illumination edge of the light guide away from the light source and further positioning an optical diverter between the light guide and the light guide. In various cases, positioning the light source includes inserting the light source through an insertion opening defined in a second surface of the panel and covering the insertion opening with a housing cover and/or a secondary cover after the light surface is inserted.

Optionally, the method includes positioning a reflector of the light system within the lighting recess. In some cases, the method optionally includes applying a decorative layer on the first surface and/or the second surface of the panel. In various optional examples, the method includes at least partially covering the recess opening of the lighting recess with an optic. In some cases, the optic forms a substantially continuous surface with the first surface of the panel. The method includes supply power to the light source through a power source.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A cabin furnishing element comprising: a panel comprising a panel body, the panel body comprising an illumination surface having an illumination zone, and defining a lighting recess within the panel body relative to the illumination surface; and a lighting system comprising a light source assembly and a light guide retained within the lighting recess defined by the panel body, wherein the lighting system is adapted to selectively illuminate a portion of the illumination zone.

EC 2. The cabin furnishing element of any of the preceding or subsequent example combinations, wherein the panel comprises at least one of a ceiling panel, a sidewall panel, a stowage bin panel, or a lavatory module panel.

EC 3. The cabin furnishing element of any of the preceding or subsequent example combinations, wherein the light guide comprises an edge, and wherein the light source assembly is positioned adjacent to the edge of the light guide in the lighting recess such that a light source emission from the light source assembly is directly into the light guide.

EC 4. The cabin furnishing element of any of the preceding or subsequent example combinations, wherein the light guide comprises an edge, wherein the light source assembly is spaced apart from the edge of the light guide in the lighting recess, and wherein the lighting system further comprises an optical diverter between the light source assembly and the edge of the light guide such that a light source emission from the light source assembly is directed into the light guide through the optical diverter.

EC 5. The cabin furnishing element of any of the preceding or subsequent example combinations, wherein the optical diverter is configured to divert the light source emission at a non-zero angle.

EC 6. The cabin furnishing element of any of the preceding or subsequent example combinations, wherein the panel body further comprises a support surface opposite from the illumination surface, and wherein the support surface defines an insertion opening providing access to the lighting recess from the support surface.

EC 7. The cabin furnishing element of any of the preceding or subsequent example combinations, further comprising a cover removably attached to the support surface, wherein the cover selectively covers the insertion opening.

EC 8. The cabin furnishing element of any of the preceding or subsequent example combinations, wherein the light source assembly comprises: a light source housing integrally formed with the panel body and defining a housing chamber; and at least one light emitting diode supported within the housing chamber, wherein an edge of the light guide is receivable within the housing chamber.

EC 9. The cabin furnishing element of any of the preceding or subsequent example combinations, wherein the light guide comprises a guide surface having an illumination edge and a border edge adjacent to the illumination edge, wherein the illumination edge is adapted to receive a light source emission from the light source, and wherein the guide surface is shaped such that the illumination edge and the border edge are non-coplanar.

EC 10. The cabin furnishing element of any of the preceding or subsequent example combinations, wherein the guide surface is shaped such that the border edge is vertically above a non-edge portion of the illumination surface.

EC 11. A cabin furnishing element comprising: a panel comprising a panel body, the panel body defining a lighting recess within the panel body and having a recess opening in the panel body; and a lighting system comprising a light source and a light guide within the lighting recess, wherein the light guide is configured to direct a light source emission from the light guide through the recess opening.

EC 12. The cabin furnishing element of any of the preceding or subsequent example combinations, wherein the lighting system further comprises a reflector within the lighting recess.

EC 13. The cabin furnishing element of any of the preceding or subsequent example combinations, wherein the light guide comprises an edge, and wherein the light source is positioned adjacent to the edge of the light guide within the lighting recess such that the light source emission from the light source is directly into the light guide.

EC 14. The cabin furnishing element of any of the preceding or subsequent example combinations, wherein the light guide comprises an edge, wherein the light source is spaced apart from the edge of the light guide in the lighting recess, and wherein the lighting system further comprises an optical diverter between the light source and the edge of the light guide such that the light source emission from the light source is directed into the light guide through the optical diverter.

EC 15. The cabin furnishing element of any of the preceding or subsequent example combinations, wherein the lighting system further comprises a diffuser covering the recess opening, wherein the diffuser is positioned such that a diffuser surface of the diffuser forms a continuous surface with a panel surface of the panel body.

EC 16. The cabin furnishing element of any of the preceding or subsequent example combinations, further comprising a light source housing within the lighting recess and defining a housing chamber, wherein the light source comprises a light emitting diode supported within the housing chamber, and wherein a portion of an edge of the light guide is within the housing chamber.

EC 17. The cabin furnishing element of any of the preceding or subsequent example combinations, further comprising an optical diverter within the housing chamber between the light emitting diode and the portion of the edge of the light guide within the housing chamber.

EC 18. The cabin furnishing element of any of the preceding or subsequent example combinations, wherein light source and light guide are slidably positioned within the lighting recess.

EC 19. The cabin furnishing element of any of the preceding or subsequent example combinations, wherein the panel comprises a ledge extending a predetermined distance over the lighting recess and defining the recess opening, and wherein the light source is positioned within the lighting recess behind the ledge.

EC 20. The cabin furnishing element of any of the preceding or subsequent example combinations, wherein an edge of the light guide is positioned within the lighting recess behind the ledge.

EC 21. A cabin furnishing element comprising: a panel comprising a panel body having a first surface and a second surface opposite from the first surface, wherein the panel body defines a lighting recess having an opening in the first surface; and a lighting system comprising a light source retained within the lighting recess and positioned such that a light source emission from the light source is directed through the recess opening.

EC 22. The cabin furnishing element of any of the preceding or subsequent example combinations, wherein the lighting system further comprises a light guide within the lighting recess and adapted to direct from the light source through the recess opening.

EC 23. The cabin furnishing element of any of the preceding or subsequent example combinations, wherein the lighting system further comprises a diffuser within the opening of the lighting recess.

EC 24. The cabin furnishing element of any of the preceding or subsequent example combinations, wherein the diffuser is positioned such that a diffuser surface is substantially continuous with the first surface.

EC 25. The cabin furnishing element of any of the preceding or subsequent example combinations, wherein the light guide comprises an edge, and wherein the light source is positioned adjacent to the edge of the light guide within the lighting recess such that the light source emission from the light source is directly into the light guide.

EC 26. The cabin furnishing element of any of the preceding or subsequent example combinations, wherein the light guide comprises an edge, wherein the light source is spaced apart from the edge of the light guide in the lighting recess, and wherein the lighting system further comprises an optical diverter between the light source and the edge of the light guide such that the light source emission from the light source is directed into the light guide through the optical diverter.

EC 27. The cabin furnishing element of any of the preceding or subsequent example combinations, wherein the optical diverter is configured to divert the light source emission at a non-zero angle.

EC 28. The cabin furnishing element of any of the preceding or subsequent example combinations, wherein the panel body further defines a maintenance opening in the second surface, wherein the maintenance provides access to the lighting recess through the second surface.

EC 29. The cabin furnishing element of any of the preceding or subsequent example combinations, wherein the panel comprises at least one of a ceiling panel, a sidewall panel, a stowage bin panel, or a lavatory module panel.

EC 30. The cabin furnishing element of any of the preceding or subsequent example combinations, wherein the first surface of the panel body is arcuate shaped.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A cabin furnishing element comprising:
   a panel comprising a panel body, the panel body comprising a first surface and a second surface, wherein the panel body defines a lighting recess within the panel body relative to the first surface, and wherein the first surface defines a recess opening for the lighting recess; and
   a lighting system comprising:
       a light source; and
       a light guide retained within the lighting recess defined by the panel body, the light guide comprising:
           a guide surface at least partially facing the recess opening,
           an illumination edge along a first portion of the guide surface, and
           a border edge adjacent to the illumination edge and along a second portion of the guide surface, wherein the illumination edge is adapted to receive a light source emission from the light source,
       wherein the light guide is shaped such that the border edge forms an infinity edge and faces a direction opposite from the recess opening.

2. The cabin furnishing element of claim 1, wherein the panel comprises at least one of a ceiling panel, a sidewall panel, a stowage bin panel, or a lavatory module panel.

3. The cabin furnishing element of claim 1, wherein the light source is spaced apart from the illumination edge of the light guide in the lighting recess, and wherein the lighting system further comprises an optical diverter between the light source assembly and the illumination edge of the light guide such that a light source emission from the light source assembly is directed into the light guide through the optical diverter.

4. The cabin furnishing element of claim 3, wherein the optical diverter is configured to divert the light source emission at a non-zero angle.

5. The cabin furnishing element of claim 1, wherein the light source assembly comprises:
   a light source housing integrally formed with the panel body and defining a housing chamber; and
   at least one light emitting diode supported within the housing chamber, wherein the illumination edge of the light guide is receivable within the housing chamber.

6. The cabin furnishing element of claim 1, wherein the second surface of the panel body defines an insertion opening providing access to the lighting recess through the second surface.

7. The cabin furnishing element of claim 6, wherein the panel body further comprises a covering projection on the second surface spanning the insertion opening and at least partially covering the insertion opening.

8. The cabin furnishing element of claim 7, wherein the covering projection is a first covering projection of a plurality of covering projections.

9. The cabin furnishing element of claim 7, wherein at least a portion of the insertion opening is uncovered.

10. The cabin furnishing element of claim 7, wherein the covering projection is removably attached to the second surface of the panel body.

11. A cabin furnishing element comprising:
a panel comprising a panel body, the panel body comprising:
a first surface having a recess opening;
a second surface opposite from the first surface;
a lighting recess within the panel body relative to the first surface and the second surface, wherein the recess opening provides access to the lighting recess through the first surface and the second surface defines an insertion opening providing access to the lighting recess through the second surface; and
a covering projection on the second surface spanning the insertion opening and at least partially covering the insertion opening; and
a lighting system comprising a light source and a light guide within the lighting recess and between the first surface and the second surface of the panel, wherein the light guide is configured to direct a light source emission from the light source and toward the recess opening.

12. The cabin furnishing element of claim 11, wherein the covering projection is a first covering projection of a plurality of covering projections.

13. The cabin furnishing element of claim 11, wherein at least a portion of the insertion opening is uncovered.

14. The cabin furnishing element of claim 11, wherein the covering projection is removably attached to the rear surface of the panel body.

15. The cabin furnishing element of claim 11, wherein the light guide comprises an edge, and wherein the light source is positioned adjacent to the edge of the light guide within the lighting recess such that the light source emission from the light source is directly into the light guide.

16. The cabin furnishing element of claim 11, wherein the light guide comprises an edge, wherein the light source is spaced apart from the edge of the light guide in the lighting recess, and wherein the lighting system further comprises an optical diverter between the light source and the edge of the light guide such that the light source emission from the light source is directed into the light guide through the optical diverter.

17. The cabin furnishing element of claim 11, wherein the lighting system further comprises a diffuser covering the recess opening, wherein the diffuser is positioned such that a diffuser surface of the diffuser forms a continuous surface with a panel surface of the panel body.

18. The cabin furnishing element of claim 11, wherein a width of the recess opening is less than a width of the lighting recess.

19. The cabin furnishing element of claim 11, wherein the panel comprises a ceiling panel, and wherein the panel body is arcuate shaped.

20. A cabin furnishing element comprising:
a panel comprising a panel body, the panel body comprising:
an illumination surface having an illumination zone;
a rear surface opposite from the illumination surface;
a lighting recess within the panel body relative to the illumination surface, wherein the rear surface defines an insertion opening providing access to the lighting recess through the rear surface; and
a covering projection on the rear surface spanning the insertion opening and at least partially covering the insertion opening, wherein at least a portion of the insertion opening is uncovered; and
a lighting system comprising a light source and a light guide within the lighting recess, wherein the light guide is configured to direct a light source emission from the light guide and selectively illuminate a portion of the illumination zone.

* * * * *